S. R. THOMPSON.

MACHINES FOR ROSSING AND GRINDING BARK.

No. 7,264. Reissued Aug. 15, 1876.

Witnesses.
A. E. Denison
R. W. Chute.

Inventor:
S. R. Thompson
by Carroll D. Wright & Brown
his attys.

N. PETERS, PHOTO-LITHOGRAPHER, WASHINGTON, D. C.

UNITED STATES PATENT OFFICE.

SAMUEL R. THOMPSON, OF PORTSMOUTH, NEW HAMPSHIRE.

IMPROVEMENT IN MACHINES FOR ROSSING AND GRINDING BARK.

Specification forming part of Letters Patent No. 176,709, dated April 25, 1876; reissue No. 7,264, dated August 15, 1876; application filed May 31, 1876.

*To all whom it may concern:*

Be it known that I, SAMUEL R. THOMPSON, of Portsmouth, in the county of Rockingham and State of New Hampshire, have invented a new and useful Improvement in Machines for Rossing and Grinding Bark, which improvement is fully set forth in the following specification, reference being had to the accompanying drawings, forming a part of this specification, in which—

Figure 1:
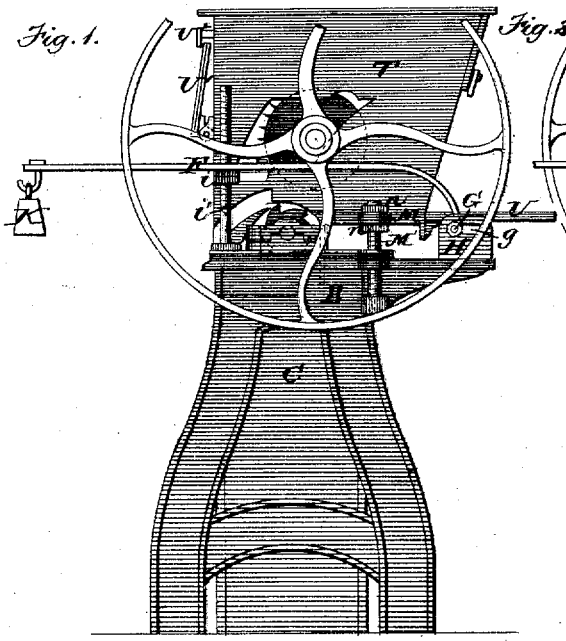
Figure 3:
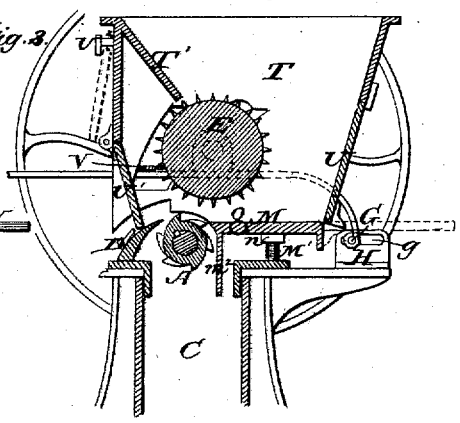
Figure 4:
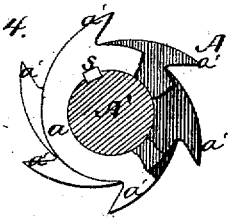
Figure 2:
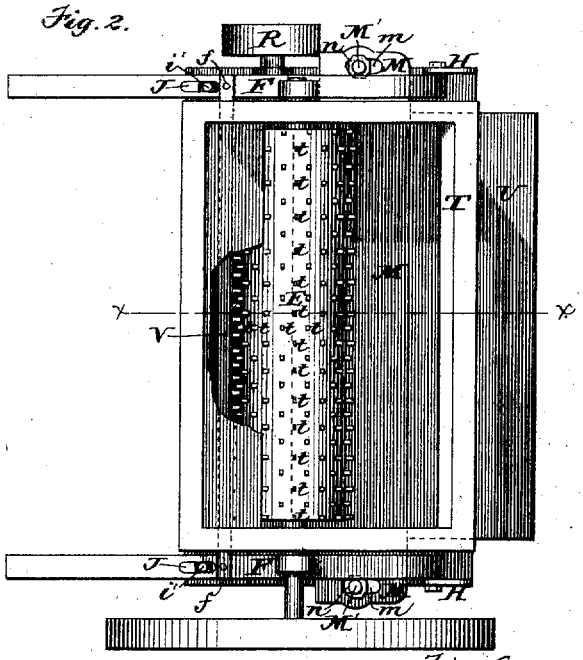
Figure 5:
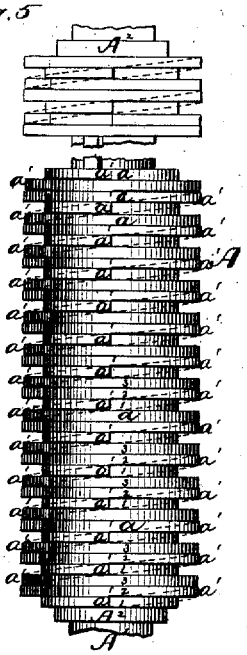

Figure 1 represents a side elevation of my improved machine. Fig. 2 represents a top view of the same. Fig. 3 represents a section on the plane of line *x x*, Fig. 2. Fig. 4 represents an end view of the cutter, with some of the collars broken away to show the spiral succession of teeth. Fig. 5 represents a top view of the cutter, and Fig. 6 a view of a triplet of collars, showing the different arrangement of teeth with regard to the slots for the spline.

This invention relates to that class of machines for reducing tan-barks which employ a rotary cutter for cutting or reducing the bark to particles, a bed-plate adapted to support the bark at the proper height as it passes to the cutter, and a feed-roll adapted to bear upon the bark with a yielding pressure, and feed it to the cutter.

The invention has for its object to effect certain improvements in the rotary cutter, the bed-plate, the feed-roll, and the general construction of a machine of the class above named, whereby the operation of reducing bark to fragments by a rotary cutter is facilitated and improved, the bark being reduced to uniform particles ready for leaching and free from dust, and a machine is produced which is capable of such adjustment as to enable its cutter to either reduce all portions of the bark, viz., the ross and rind, or to separate any desired thickness of rind from the ross, reducing the rind to particles at the same time it separates it from the ross.

To these ends my invention consists, first, in the peculiar arrangement of teeth on the rotary cutter, whereby the latter is adapted to reduce the bark into uniform particles of the right size for leaching without becoming clogged, or reducing the bark to dust; secondly, in the provision of means for adjusting both the feed-roll and the bed-plate, or either of them, horizontally and vertically with relation to the rotary cutter, whereby the machine is adapted to either reduce the entire bark, or to "ross" the same and reduce only the rind, separating the latter from the ross at the same time; thirdly, in the provision of means for preventing the teeth of the feed-roll from becoming clogged; fourthly, in a peculiarly-constructed hopper, adapted to be used in connection with the bed-plate, feed-roll, and cutter when broken pieces or fragments of bark are to be reduced, and to be readily made inoperative, so as not to interfere with the reduction or rossing of large sheets of bark; and, fifthly, in a hinged flap or leaf, adapted either to form an extension of the bed-plate or a cover for one side of the hopper, all of which I will now proceed to describe.

In the drawings, A represents the rotary cutter, which is composed of a series of collars, *a*, located in close contact with each other on a shaft or arbor, $A^1$, and rigidly connected to said arbor by a key or spline, *s*, each collar having a suitable orifice and slot to receive the arbor and spline. The arbor is journaled in fixed bearing-blocks on the supporting-frame B, and is adapted to be rotated by means of a pulley, R. Each collar *a* is provided with one or more teeth, *a'*, projecting from its periphery. These teeth are of such form that each shall shave or cut a particle from a piece of bark, which is pressed against the cutter, the particles or cuttings being of the right size for steeping or leaching without further reduction or grinding.

Each tooth *a'* is of the same width as the collar on which it is made, and the collars are so arranged on the arbor that the teeth are in parallel series, each series being in a longitudinal row, parallel, or thereabout, with the axis, and each tooth in each series being separated from the adjacent tooth on each side by a space twice its own width, while the spaces between the teeth form a continuous channel, winding spirally around the cutter. It will be seen that each tooth thus occupies an isolated position, it projects throughout its entire extent above the general surface of the cutter, and is not covered to any material degree on either side by either of the adjacent teeth of the series.

Figure 6:
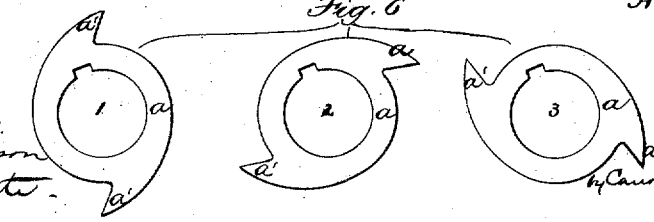

In the present case I effect this arrangement by making two teeth on each collar, and arranging the collars in triplets, 1 2 3, 1 2 3, &c., so that the teeth of each triplet shall form one in each of six straight rows, and three in each of two spiral rows, the straight rows being composed of teeth on every third collar. The teeth on the several collars of each triplet are made in different relations to the slots for the key or spline, in order to effect this arrangement, as shown in Figs. 4 and 6.

By the described arrangement every tooth is provided on each side with an open space of twice its own width, and as the teeth follow each other in spiral order on the successive collars, these open spaces also follow each other in spiral order; hence there are, practically, spiral spaces between the spiral rows of teeth, the spaces being not less than double the width of the teeth, (as shown in dotted lines in Fig. 5,) and affording free passage on each side of the teeth for the fragments or cuttings of bark which might become wedged between the teeth if they were separated by spaces only equal to their own width, in which case the succeeding teeth in the spiral series would intersect and obstruct the spaces. The collars *a* are confined by suitable nuts or shoulders $A^2$ near the ends of the arbor $A^1$.

C represents a chute or receptacle under the cutter, into which the fragments of bark and rind fall. D is an inclined back plate, over which the ross passes when it is separated from the rind. M represents the bed-plate, which is located in front of the cutter, and is supported by vertical threaded standards M′, rising from the frame B, these standards passing through tapped sockets in the frame B, and also through slots *m* in the bed-plate. On each side of the bed-plate the standards M′ are provided with nuts *n n*. By turning the standards M′ in their tapped sockets the bed-plate may be raised or lowered, so as to regulate the projection of the cutter above the plane of the upper surface of the bed-plate, and permit the cutter to reduce the entire bark, or to separate any desired thickness of rind therefrom.

By means of the slots *m* the bed-plate can be moved horizontally toward or away from the cutter, so as to keep its inner edge at a uniform distance from the cutter at whatever height the bed-plate may be fixed. This feature is of much importance, as the inner edge of the bed plate would be farther from the cutter when elevated than when depressed, if the bed-plate were not adjustable horizontally; and it will be readily seen that the edge of the bed-plate should be at all times as near to the cutter as is possible.

The bed-plate is provided at its inner edge with an apron, $m^2$, which projects downwardly into the chute or receptacle C, and prevents the fragments of bark from being thrown by the cutter through the space which necessarily exists between the top of the chute or receptacle and the bed-plate when the latter is elevated.

O represents a friction-roller, which is journaled in a slot in the bed-plate, and projects slightly above the upper surface of the latter to facilitate the passage of bark to the cutter.

E represents the feed-roll, which is substantially parallel with the cutter, and has its bearings in parallel arms F F, these arms being pivoted to ears H at one end of the supporting-frame by bolts G, which pass through horizontal slots *g* in the ears H, and are adapted to be moved horizontally in said slots, and thus effect the horizontal adjustment of the roll E. The periphery of the feed-roll is provided with radial teeth or spurs *t*, which are arranged in parallel circular rows extending around the periphery of the roll, and also in straight rows extending from end to end of the roll, the straight rows being composed of teeth in alternate circular rows. As the result of this arrangement, only the teeth in the alternate circular rows radiate in like directions and strike the bark simultaneously. The teeth in the circular rows are thus enabled to be made sufficiently far apart to obviate the liability of cutting grooves in the bark, which would exist if the number of teeth in each circular row was equal to the number of straight rows, it being desirable that the straight rows should be comparatively close together in order that one row may take hold of the bark before one or more of the preceding rows leave it.

V represents a clearer, which consists of a bar attached to the arms F, close to and parallel with the periphery of the feed-roll, the bar being provided with teeth which project between the circular rows of teeth and form obstructions, which prevent particles of bark or ross from becoming lodged between the teeth and rendering them inoperative. The clearer V is attached somewhat loosely to the arms F by bolts *f*, or other equivalent devices, in order that each arm may be allowed to rise and fall independently to a slight extent, and thus prevent the breaking or bending of the clearer when bark having a thickness which varies transversely is passing under the feed-roll. The feed-roll is enabled to rise and fall by the turning of the arms F F on their pivots, and is supported at any desired height by adjustable stops or nuts *i*, which are located on the threaded vertical standards *i′*, these standards rising from the frame B and passing through slots J J′ in the arms F, which latter rest on the nuts *i*, as shown. By means of the slots *g* and nuts *i* the feed-roll can be adjusted horizontally and supported at any desired point above the cutter and bed-plate, these adjustments enabling the feed-roll to conform to the position of the bed-plate, and to be moved toward or away from the cutter, so that it may be located over the cutter when the machine is used for rossing, or depressed, so that its lowest part shall be below the level of the highest part of the cutter when the machine is used for reducing the entire bark. The arms F are preferably supplied with detachable weights K, which increase the pressure of the feed-roll on the bark.

T represents a hopper, which is attached to the bed-plate M over the cutter, and constitutes a casing around the feed-roll, the ends of the hopper being provided with slots through which the journals or arbors of the feed-roll pass, and in which they are allowed to rise and fall.

The hopper is provided at its sides with hinged flaps or doors U $U^1$, which are adapted to open and close the sides of the hopper. When the flaps U $U^1$ are opened, as shown in Figs. 1 and 2, sheets of bark can be passed horizontally through the openings in the sides of the hopper, and between the feed-roll and cutter, but when the flaps are closed no access can be had to the cutter excepting through the top of the hopper, which constitutes a receptacle for holding a quantity of pieces of bark in such relation to the feed-roll that they will be carried automatically by the latter to the cutter. It will be seen, therefore, that the hopper is used only when it is desirable to reduce a quantity of broken pieces of bark which are too small to be presented to the machine singly.

The hopper is provided with an inclined board, T′, which prevents the pieces of bark from falling behind the feed-roll. The flap U is adapted to be turned downwardly, and constitute an extension of the bed-plate, as shown in Figs. 1 and 2, when not in use, to close the side of the hopper, the flap $U^1$ being turned upwardly meanwhile and held by a catch or button, $U^2$, on the upper part of the hopper.

The general operation of the machine is as follows: When sheets of bark are to be rossed the bed-plate is raised until the projection of the cutter above the horizontal plane of the upper surface of the bed-plate is equal to the thickness of rind to be removed from the bark. The feed-roll is correspondingly adjusted, and the cutter and feed-roll are rotated differentially in the same direction, the former rotating much more rapidly than the latter. The flaps U $U^1$ being open, the bark is passed between the feed-roll and the cutter, the latter removing the desired thickness of rind, which falls in particles into the chute or receptacle C, the ross passing over the cutter and the back plate D. When sheets of bark are to be entirely reduced to particles, the bed-plate is lowered until the projection of the cutter above the plane of the upper surface of the bed-plate is equal to or greater than the thickness of the bark to be reduced, the feed-roll being moved away from the cutter horizontally, and lowered sufficiently to press the bark against the bed-plate as it feeds it to the cutter. When broken pieces or fragments are to be reduced, the sides of the hopper are closed by the flaps U $U^1$, and the hopper is filled with the pieces, the adjustment of the bed-plate and feed-roll preferably remaining as last described.

I claim as my invention—

1. The rotary cutter for bark-rossing machines, herein shown and described, provided with teeth, which, on a line parallel with the axis of the roller, are separated by spaces equal to double their own width, as specified.

2. A rotary cutter for bark-cutting machines, provided with teeth arranged in series parallel to the axis, and separated laterally by continous channels winding spirally around the cutter and isolating each tooth, as specified.

3. The slotted bed-plate M, combined with the threaded adjustable standards M′, rising from the frame B, and provided with jam-nuts *n*, substantially as described.

4. The feed-roll E, combined with the horizontally and vertically-adjustable pivoted arms F F, substantially as described.

5. The pivoted arms F F, having the slots J J′, combined with the threaded standards *i*′, having the nuts *i*, substantially as described.

6. The horizontally and vertically-adjustable feed-roll E, combined with the rotary cutter A, located in fixed bearings, substantially as described.

7. The combination of the horizontally and vertically-adjustable feed-roll E, the horizontally and vertically-adjustable bed-plate M, and the rotary cutter A, located in fixed bearings, substantially as described.

8. The clearer V, attached to the arms F, in combination with the feed-roll E, substantially as described, for the purpose specified.

9. The hopper T, having the hinged flaps or doors U $U^1$, combined with the feed-roll E, and rotary cutter A, substantially as described, for the purpose specified.

10. The flap U, hinged to the bed-plate M, and adapted either to form an extension of the bed-plate or a covering for the side of the hopper, substantially as described.

In testimony whereof I have signed my name to this specification this 26th day of May, A. D. 1876, in the presence of two subscribing witnesses.

SAMUEL R. THOMPSON.

Witnesses:
C. F. BROWN,
A. E. DENISON.